United States Patent
McHenry et al.

(10) Patent No.: US 9,422,857 B2
(45) Date of Patent: Aug. 23, 2016

(54) EXHAUST NOZZLE TIP DEVICE AND SYSTEM

(71) Applicant: Caterpillar Inc., Peoria, IL (US)

(72) Inventors: Ryan McHenry, Crawfordsville, IN (US); Ronald Maloney, Peoria, IL (US); Andrew Gaarder, Lafayette, IN (US); Christopher Reed, Washington, IL (US); Lee Kress, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 68 days.

(21) Appl. No.: 14/573,321

(22) Filed: Dec. 17, 2014

(65) Prior Publication Data

US 2016/0177815 A1 Jun. 23, 2016

(51) Int. Cl.
*F01N 13/10* (2010.01)
*F02B 37/02* (2006.01)

(52) U.S. Cl.
CPC .............. *F02B 37/02* (2013.01); *F01N 13/10* (2013.01); *F01N 13/102* (2013.01)

(58) Field of Classification Search
CPC ....... F02B 37/02; F01N 13/10; F01N 13/102; F01N 13/20
See application file for complete search history.

(56) References Cited

U.S. PATENT DOCUMENTS

| | | | |
|---|---|---|---|
| 2,578,932 A * | 12/1951 | Hinze | F02F 1/4264 123/188.14 |
| 3,077,071 A | 2/1963 | Leichtfuss | |
| 4,179,884 A | 12/1979 | Koeslin | |
| 4,693,079 A | 9/1987 | Wuensche et al. | |
| 5,349,817 A | 9/1994 | Bekkering | |
| 6,038,769 A | 3/2000 | Bonny et al. | |
| 6,122,911 A | 9/2000 | Maeda et al. | |
| 6,134,886 A * | 10/2000 | Bussmann | F01N 13/10 60/323 |
| 6,220,605 B1 | 4/2001 | Becker, Jr. | |
| 6,247,552 B1 | 6/2001 | Kovar et al. | |
| 6,427,440 B1 | 8/2002 | Bonny et al. | |
| 6,745,561 B2 | 6/2004 | Kim | |
| 7,837,233 B2 | 11/2010 | Johnston et al. | |
| 2009/0139220 A1 | 6/2009 | Schmelzer | |
| 2013/0093181 A1 | 4/2013 | Oxenknecht et al. | |
| 2014/0116036 A1 | 5/2014 | Karim et al. | |
| 2014/0182290 A1 | 7/2014 | Bhide et al. | |
| 2014/0208726 A1 | 7/2014 | Karim et al. | |

FOREIGN PATENT DOCUMENTS

| | | |
|---|---|---|
| CN | 203098015 U | 7/2013 |
| EP | 1475562 A1 | 11/2004 |
| GB | 1432293 A | 4/1976 |

* cited by examiner

*Primary Examiner* — Audrey K Bradley
(74) *Attorney, Agent, or Firm* — Baker & Hostetler LLP

(57) ABSTRACT

An exhaust nozzle tip for an exhaust runner conveying a first flow of an exhaust gas includes an inlet, outlet, and nozzle passageway. The inlet receives a second flow of the exhaust gas from an internal combustion engine. The outlet introduces the second flow into the first flow in the exhaust runner. The nozzle passageway conveys the second flow from the inlet to the outlet and is defined by an upstream curved surface, and a downstream surface. The downstream surface includes a first downstream curve, a straight portion, and a second downstream curve. The first downstream curve transitions from perpendicular to the first flow to between 60 degrees and 15 degrees relative to the first flow. The straight portion extends from the first downstream curve. The second downstream curve transitions from the straight portion to a downstream portion of the exhaust runner.

20 Claims, 2 Drawing Sheets

EXHAUST NOZZLE TIP DEVICE AND SYSTEM

TECHNICAL FIELD

This patent disclosure relates generally to an exhaust system and, more particularly, to an exhaust nozzle tip in an engine exhaust system.

BACKGROUND

In modern engine technology, turbochargers are powered by the hot exhaust gas from the engine. In general, the higher the exhaust velocity, the greater the amount of power in the exhaust that is available to power the turbochargers. It is desirable to convey the hot exhaust gas from the engine to the turbocharger in as high a temperature state as is possible to maintain the exhaust gas volume and, therefore, velocity in the exhaust system. However, it is also desirable to reduce the temperature of components within the engine compartment. Prior techniques provide water jackets disposed about exhaust manifolds to reduce the temperature of the manifold. Unfortunately, the use of water jackets reduces the temperature of the exhaust gas, thereby reducing the energy supplied to the turbocharger and also the temperature of recoverable heat energy.

Some attempts have been made to produce a manifold with temperatures within allowable limits and, at the same time, to maintain the temperature of the exhaust gas as high as possible. One such system described in U.S. Pat. No. 5,463,867 ("the '867 patent") provides a sleeve inside the manifold which is surrounded by an air space. The air space provides insulation for maintaining the exhaust gas temperature as high as possible and, at the same time, to reduce the amount of heat transmitted to the water of the water jacket. However, the flow of the exhaust gasses within this system is restricted by the geometry of the connection pipes between the cylinder outlets and the exhaust pipe. As such, in the '867 patent and other systems, exhaust gas velocity is reduced.

Some other, non-water jacketed, exhaust systems such as U.S. Pat. No. 6,745,561 attempt to retain exhaust gas velocity by converging a set of runners in a manifold. However, turbulent exhaust flow is still present at the convergence of the runners and the overall shape of the resulting manifold is not conducive to jacketing.

Accordingly, there is a need for an improved exhaust system to address the problems described above and/or problems posed by other conventional approaches.

SUMMARY

The foregoing needs are met, to a great extent, by the present disclosure, wherein aspects of an improved exhaust system are provided.

In one aspect, the disclosure describes an exhaust nozzle tip for an exhaust runner conveying a first flow of an exhaust gas. The exhaust nozzle tip includes an inlet, an outlet, and a nozzle passageway. The inlet is configured to receive a second flow of the exhaust gas from an internal combustion engine. The outlet is configured to introduce the second flow of the exhaust gas into the first flow of the exhaust gas in the exhaust runner. The nozzle passageway is configured to convey the second flow of the exhaust gas from the inlet to the outlet. The nozzle passageway is defined by an upstream curved surface and a downstream surface. The upstream curved surface is a continuous curve from perpendicular to the first flow to between 60 degrees and 15 degrees relative to the first flow. The downstream surface includes a first downstream curve, a straight portion, and second downstream curve. The first downstream curve transitions from perpendicular to the first flow to between 60 degrees and 15 degrees relative to the first flow. The straight portion extends from the first downstream curve. The second downstream curve transitions from the straight portion to a downstream portion of the exhaust runner. The second downstream curve has a side portion that continues along a line defined by the straight portion. The second flow of the exhaust gas is introduced into the first flow of the exhaust gas while maintaining a velocity of the first flow of the exhaust gas.

In another aspect, the disclosure describes an exhaust assembly for an internal combustion engine. The exhaust assembly includes an exhaust runner and an exhaust nozzle tip. The exhaust runner is configured to convey a first flow of exhaust gas to a turbocharger. The exhaust nozzle tip is configured to fluidly connect the internal combustion engine to the exhaust runner. The exhaust nozzle tip includes an inlet, an outlet, and a passageway. The inlet is configured to receive a second flow of an exhaust gas from an internal combustion engine. The outlet is configured to introduce the second flow of the exhaust gas into the first flow of the exhaust gas in the exhaust runner. The passageway is configured to convey the second flow of the exhaust gas from the inlet to the outlet. The passageway is defined by an upstream curved surface and a downstream surface. The upstream curved surface is a continuous curve from perpendicular to the first flow to between 60 degrees relative to the first flow and 15 degrees relative to the first flow. The downstream surface has a first downstream curve, a straight portion, and a second downstream curve. The first downstream curve transitions from perpendicular to the first flow to between 60 degrees relative to the first flow and 15 degrees relative to the first flow. The straight portion extends from the first downstream curve. The second downstream curve transitions from the straight portion to a downstream portion of the exhaust runner. The second downstream curve has a side portion that continues along a line defined by the straight portion. The first flow of an exhaust gas is introduced into a first flow of the exhaust gas while maintaining a velocity of the first flow of the exhaust gas.

In yet another aspect, the disclosure describes a power supply. The power supply includes an internal combustion engine, an air system to deliver air to the internal combustion engine, and an exhaust assembly for the internal combustion engine. The exhaust assembly includes an exhaust runner and an exhaust nozzle tip. The exhaust runner is configured to convey a first flow of exhaust gas to a turbocharger. The exhaust nozzle tip is configured to fluidly connect the internal combustion engine to the exhaust runner. The exhaust nozzle tip includes an inlet, an outlet, and a passageway. The inlet is configured to receive a second flow of an exhaust gas from an internal combustion engine. The outlet is configured to introduce the second flow of the exhaust gas into the first flow of the exhaust gas in the exhaust runner. The passageway is configured to convey the second flow of the exhaust gas from the inlet to the outlet. The passageway is defined by an upstream curved surface and a downstream surface. The upstream curved surface is a continuous curve from perpendicular to the first flow to between 60 degrees relative to the first flow and 15 degrees relative to the first flow. The downstream surface has a first downstream curve, a straight portion, and a second downstream curve. The first downstream curve transitions from perpendicular to the first flow to between 60 degrees relative to the first flow and 15 degrees relative to the first flow. The straight portion extends from the first downstream curve. The second downstream curve transitions from the straight portion to a downstream portion of the exhaust runner. The second downstream curve has a side portion that continues along a line defined by the straight portion. The first flow of an exhaust gas is introduced into a first flow of the exhaust gas while maintaining a velocity of the first flow of the exhaust gas.

There has thus been outlined, rather broadly, certain aspects of the disclosure in order that the detailed description thereof herein may be better understood, and in order that the present contribution to the art may be better appreciated. There are, of course, additional aspects that will be described below and which will form the subject matter of the claims appended hereto.

In this respect, before explaining at least one example in detail, it is to be understood that the disclosure is not limited in its application to the details of construction and to the arrangements of the components set forth in the following description or illustrated in the drawings. The disclosed device and method is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various aspects. It is important, therefore, that the claims be regarded as including such equivalent constructions insofar as they do not depart from the spirit and scope of the various aspects.

DETAILED DESCRIPTION

Figure 1:
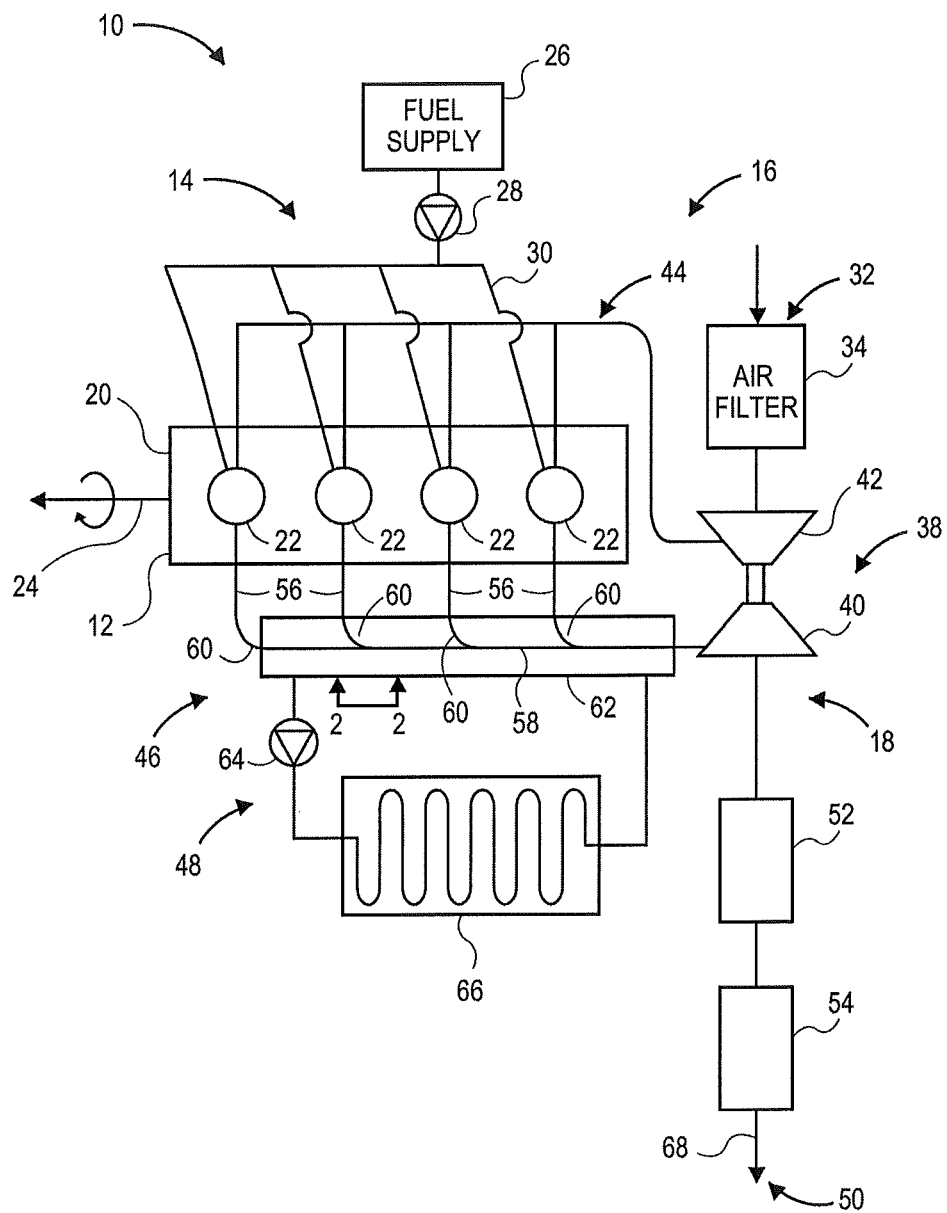
FIG. 1 is a diagrammatic schematic of an exemplary power source, according to an aspect of the disclosure.

Referring to FIG. 1, a power source 10 is shown. The power source 10 includes an internal combustion engine 12, a fuel system 14, an air system 16, and an exhaust system 18. The engine 12 includes a block 20, a plurality of cylinders 22, and a drive shaft 24. The fuel system 14 includes a fuel supply 26, a fuel pump 28, and fuel lines 30. The internal combustion engine 12 may be a compression ignition engine, such as a diesel engine or a homogeneous charge compression ignition (HCCI) engine, for example, or a spark ignition engine. Although not shown, the fuel system 14 may also include other conventional components such as fuel filters, fuel injectors, and the like. In addition, other conventional components such as various filters, spark plugs or glow plugs, valves, controllers, and the like are suitable for use with various aspects of the power source 10.

The air system 16 includes an air inlet 32, an air filter 34, a turbocharger 38 having a turbine 40 and a compressor 42, and an intake manifold 44. The exhaust system 18 includes an exhaust manifold assembly 46, a water jacket assembly 48, the turbine 40, and a tail pipe 50. Optionally, the exhaust system 18 may include an emissions control device 52, such as a particulate filter, an oxidation catalyst, a selective reduction catalyst, or a three-way catalyst, for example; an acoustic muffler 54, or combinations thereof. The exhaust manifold assembly 46 includes an exhaust header or a plurality of exhaust pipes 56, an exhaust runner 58, and a plurality of exhaust nozzle tips 60 to fluidly connect the exhaust pipes 56 to the exhaust runner 58. The water jacket assembly 48 includes a water jacket 62, a water pump 64, and a heat exchanger 66.

As is generally understood, fuel and air are combined and ignited in combustion chambers defined at least partly by the cylinders 22 and the block 20 to drive the engine 12 and generate power that is output from the drive shaft 24. The combustion byproducts, i.e. an exhaust gas 68, then flow through the exhaust system 18. As the exhaust gas 68 flows through the turbine 40, the exhaust gas 68 urges the turbine 40 to rotate which, in turn, rotates the compressor 42 for compressing fresh air. The compressed fresh air then flows to an intake manifold 44 of the engine 12. Various well-understood controls may be utilized to regulate the temperature, power output, and the like of the power source 10.

The power source 10 is suitable for use with a fixed or mobile machine that performs some type of operation associated with an industry such as mining, construction, farming, transportation, power generation, or another industry known in the art. For example, the power source 10 may power an earth moving machine such as an excavator, a dozer, a loader, a backhoe, a motor grader, a dump truck, or another earth moving machine. In a particular example, the power source 10 includes an engine 12 configured to burn a fuel such as natural gas, gasoline, diesel, or any other combustible fuel known in the art.

As described herein, the exhaust manifold assembly 46 is configured to improve the flow of the exhaust gas 68 therethrough. More particularly, the exhaust nozzle tips 60 include a geometry configured to facilitate an introduction of the exhaust gas 68 into the exhaust runner 58 with reduced turbulence and, therefore, retention of the exhaust gas 68 velocity. Aspects of the disclosure may advantageously preserve kinetic energy, static pressure, or both, of the exhaust gas 68 through the exhaust manifold assembly 46 and thereby increase fluid power available to drive the turbocharger 38. This increased power driving the turbocharger 38 promotes higher compression of fresh air delivered to the engine 12 which, in turn, facilitates greater power output at the drive shaft 24. In addition to these direct improvements in the power production of the power source 10, aspects of the disclosure may enable a reduction in the physical size of the power source 10 while maintaining power output comparable to physically larger conventional power sources. By reducing the size, and therefore weight, of the power source 10, a lighter suspension, frame, and various other components may be utilized by a machine using the power source 10. As such, aspects described herein may greatly facilitate improvements in performance, improved fuel efficiencies, reduced material costs, and the like.

Figure 2:
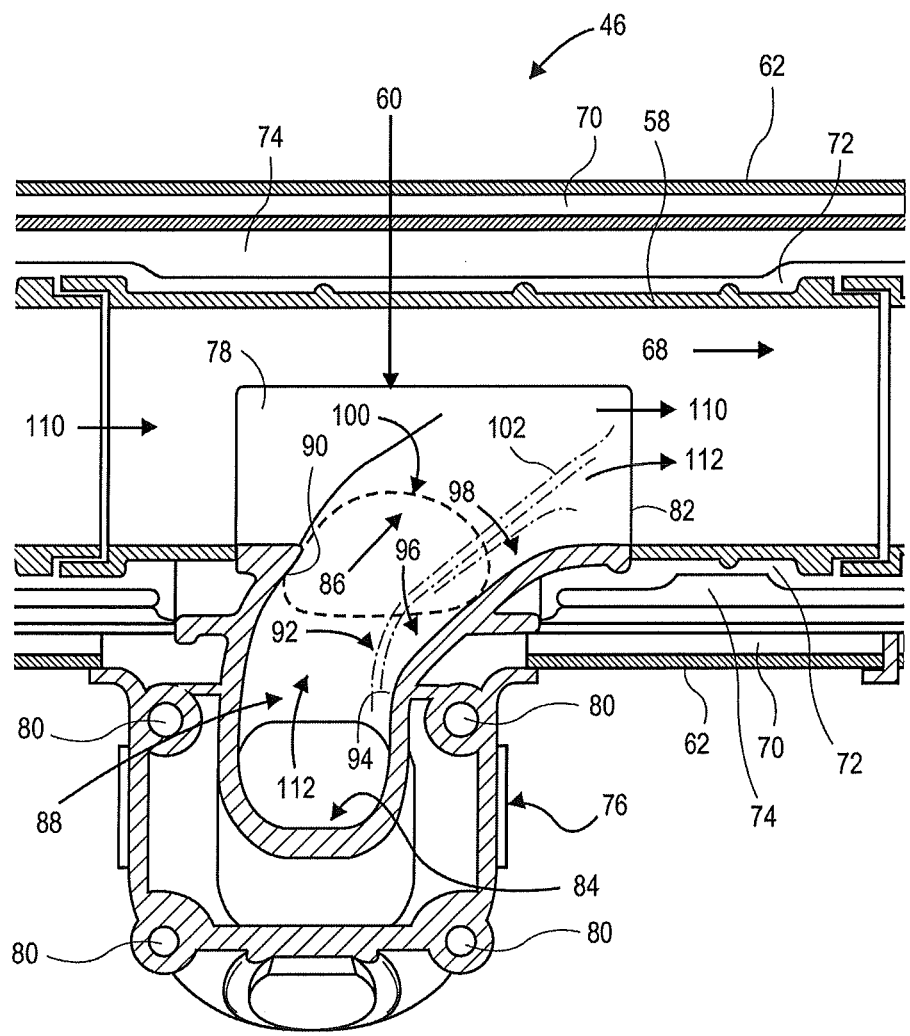
FIG. 2 is a cross sectional view 2-2 of a portion of an exhaust manifold, according to an aspect of the disclosure.

FIG. 2 is a cross sectional view 2-2 of a portion of the exhaust manifold assembly 46 according to an aspect of the disclosure. As shown in FIG. 2, the exhaust manifold assembly 46 includes the exhaust runner 58 and the exhaust nozzle tip 60. The exhaust runner 58 is configured to convey a first flow 110 of the exhaust gas 68 to the turbocharger 38 shown in FIG. 1. The water jacket 62 is disposed about the exhaust runner 58 and configured to receive a flow of water 70 therethrough.

An air gap 72 disposed between the exhaust runner 58 and the water jacket 62 to reduce a thermal transfer of heat from the exhaust runner 58 to the flow of water 70 in the water jacket 62. Optionally, a layer of insulation 74 may also be disposed about the exhaust runner 58 to further reduce a thermal transfer of heat from the exhaust runner 58 to the flow of water 70 in the water jacket 62.

The exhaust nozzle tip 60 is configured to fluidly connect the internal combustion engine 12 to the exhaust runner 58. In this regard, the exhaust nozzle tip 60 includes an engine flange 76 and a runner flange 78. In a particular example, the engine flange 76 has a plurality of bores 80 for the passage of a respective plurality of bolts (not shown) for securing the exhaust nozzle tip 60 to the internal combustion engine 12. In other examples, various other fasteners may be utilized to fasten the exhaust nozzle tip 60 to the internal combustion engine 12.

The runner flange 78 is configured to mate with a runner cutout 82 of the exhaust runner 58. In a particular example, the runner flange 78 is welded into the runner cutout 82. In other examples, various other fasteners may be utilized to fasten the runner flange 78 to the exhaust runner 58. The exhaust nozzle tip 60 includes an inlet 84, an outlet 86, and a passageway 88. The inlet 84 is configured to receive a second flow 112 of the exhaust gas 68 from a cylinder 22 of the internal combustion engine 12 (shown in FIG. 1). The outlet 86 is configured to introduce the second flow 112 of the exhaust gas 68 into the first flow 110 of the exhaust gas 68 in the exhaust runner 58.

The passageway 88 is configured to convey the second flow 112 of the exhaust gas 68 from the inlet 84 to the outlet 86. The passageway 88 is defined by an upstream curved surface 90 and a downstream surface 92. The upstream curved surface 90 may be a continuous curve that directs the second flow 112 of the exhaust gas 68 up into the first flow 110 of the exhaust gas 68 in the exhaust runner 58. According to an aspect of the disclosure, the upstream curved surface 90 begins along a line that is perpendicular to the first flow 110 and is a continuous arc that ends within the exhaust runner 58 at an angle between 60 degrees relative to the first flow 110 and 15 degrees relative to the first flow 110 of the exhaust gas 68. In this manner, the second flow 112 of the exhaust gas 68 is accelerated in the direction of the first flow 110 of the exhaust gas 68 along the arc of the upstream curved surface 90 and enters the first flow 110 of the exhaust gas 68 with approximately the same velocity in the direction of the first flow 110 of the exhaust gas 68. By approximately matching the velocities of the two flows, turbulence can be reduced or minimized.

The downstream surface 92 has a first downstream curve 94, a straight portion 96, and a second downstream curve 98. The first downstream curve 94 curves relatively more sharply than the upstream curved surface 90 to generate a diverging zone 100. In a particular example, the first downstream curve 94 transitions from perpendicular to the first flow 110 to between 60 degrees relative to the first flow 110 and 15 degrees relative to the first flow 110. This diverging zone 100 increases a cross sectional area of the nozzle passageway 88. In this manner, a density of the second flow 112 of the exhaust gas 68 can be reduced just prior to being introduced into the first flow 110 of the exhaust gas 68. As these two flows merge, the diverging zone 100 provides a volume for the second flow 112 of the exhaust gas 68 to be compressed into by the first flow 110 of the exhaust gas 68. In this manner, turbulence is reduced during the merger of the two flows.

The straight portion 96 extends outward from the first downstream curve 94 to further generate the volume for the second flow 112 of the exhaust gas 68 to be compressed into by the first flow 110 of the exhaust gas 68. The second downstream curve 98 transitions from the straight portion 96 to a downstream portion of the exhaust runner 58. The second downstream curve 98 has a side portion 102 that continues along a line defined by the straight portion 96. The first flow 110 of the exhaust gas 68 is introduced into a first flow 110 of the exhaust gas 68 while maintaining a velocity of the first flow 110 of the exhaust gas 68.

INDUSTRIAL APPLICABILITY

The present disclosure may be applicable to any power supply for generating power. Aspects of the disclosed exhaust system 18 may promote greater power output from the power supply, greater fuel efficiency, operational flexibility, reduced packaging size, performance improvements, or combinations thereof, for power supplies in general and power supplies for use in mobile machines in particular.

Applicants discovered that a conventional exhaust system generated turbulent flow in the exhaust runner 58 that decreased the velocity of the exhaust gas 68 prior to delivery to the turbocharger 38. Applicants further discovered that the turbulence caused by the conventional exhaust system reduced the power output of the turbocharger 38 and, therefore, the ability of the turbocharger 38 to compress and deliver fresh air to the engine 12. Applicants further discovered that the power output of power supplies having these conventional exhaust systems may be increased by improvements to the exhaust systems. As described herein, aspects of the disclosure may advantageously preserve kinetic energy, static pressure, or both, of the exhaust gas 68 through the exhaust manifold assembly 46 and thereby increase fluid power available to drive the turbocharger 38. This increased power driving the turbocharger 38 promotes higher compression of fresh air delivered to the engine 12 which, in turn, facilitates greater power output at the drive shaft 24. In addition to these direct improvements in the power production of the power source 10, aspects of the disclosure may enable a reduction in the physical size of the power source 10 while maintaining power output comparable to physically larger conventional power sources. By reducing the size, and therefore weight, of the power source 10, a lighter suspension, frame, and various other components may be utilized by a machine using the power source 10. As such, aspects described herein may greatly facilitate improvements in performance, improved fuel efficiencies, reduced material costs, and the like.

According to an aspect of the disclosure shown in FIG. 1, in operation, the exhaust manifold assembly 46 is fastened to the engine 12 using fasteners. Proper sealing between the exhaust manifold assembly 46 and the engine 12 is generally achieved using gaskets. The exhaust manifold assembly 46 is aligned with the exhaust ports for communication of the exhaust gas 68 from the engine 12 through the exhaust runner 58 to the turbine section 40 of the turbocharger 38. The exhaust gas 68 drives the turbine section 40 of the turbocharger 38 which is operatively connected to the compressor section 42 of the turbocharger 38. The compressor section 42 compresses the fresh air and routes the compressed air to the intake manifold 44 of the engine 12.

According to an aspect of the disclosure shown in FIG. 2, exhaust nozzle tip 60 introduces the exhaust gas 68 into the exhaust runner 58 smoothly with minimal turbulence that maintains the velocity of the exhaust gas 68 in the exhaust runner 58. In this manner, the velocity of the exhaust gas 68 delivered to the turbocharger 38 is relatively higher than in conventional exhaust systems. This higher velocity exhaust gas 68 shown herein provides greater power for the turbocharger 38 and, ultimately, for the power source 10.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified. The many features and advantages of the various aspects are apparent from the detailed specification, and thus, it is intended by the appended claims to cover all such features and advantages that fall within the true spirit and scope of the aspects. Further, since numerous modifications and variations will readily occur to those skilled in the art, it is not desired to limit the aspects to the exact construction and operation illustrated and described, and accordingly, all suitable modifications and equivalents may be resorted to, falling within the scope of the various aspects.

We claim:

1. An exhaust nozzle tip for an exhaust runner conveying a first flow of an exhaust gas, the exhaust nozzle tip comprising:
   an inlet configured to receive a second flow of the exhaust gas from an internal combustion engine;
   an outlet configured to introduce the second flow of the exhaust gas into the first flow of the exhaust gas in the exhaust runner; and
   a nozzle passageway configured to convey the second flow of the exhaust gas from the inlet to the outlet, the nozzle passageway being defined by an upstream curved surface and a downstream surface, the upstream curved surface being a continuous curve from perpendicular to the first flow to between 60 degrees and 15 degrees relative to the first flow, the downstream surface including:
      a first downstream curve transitioning from perpendicular to the first flow to between 60 degrees and 15 degrees relative to the first flow;
      a straight portion extending from the first downstream curve; and
      a second downstream curve transitioning from the straight portion to a downstream portion of the exhaust runner, wherein the second downstream curve has a side portion that continues along a line defined by the straight portion, wherein the second flow of the exhaust gas is introduced into the first flow of the exhaust gas while maintaining a velocity of the first flow of the exhaust gas.

2. The exhaust nozzle tip according to claim 1, further comprising:
   a diverging zone beginning at the first downstream curve, wherein the downstream surface diverges from the upstream curved surface to increase a cross sectional area of the nozzle passageway.

3. The exhaust nozzle tip according to claim 1, further comprising:
   an engine flange having a plurality of bores for passage of a respective plurality of bolts for securing the exhaust nozzle tip to the internal combustion engine.

4. The exhaust nozzle tip according to claim 1, further comprising:
   a runner flange configured to mate with a runner cutout of the exhaust runner.

5. The exhaust nozzle tip according to claim 4, wherein the runner flange is welded into the runner cutout.

6. An exhaust assembly for an internal combustion engine, the exhaust assembly comprising:
   an exhaust runner configured to convey a first flow of exhaust gas to a turbocharger; and
   an exhaust nozzle tip to fluidly connect the internal combustion engine to the exhaust runner, the exhaust nozzle tip including:
      an inlet configured to receive a second flow of an exhaust gas from an internal combustion engine;
      an outlet configured to introduce the second flow of the exhaust gas into the first flow of the exhaust gas in the exhaust runner; and
      a passageway configured to convey the second flow of the exhaust gas from the inlet to the outlet, the passageway being defined by an upstream curved surface and a downstream surface, the upstream curved surface being a continuous curve from perpendicular to the first flow to between 60 degrees relative to the first flow and 15 degrees relative to the first flow, the downstream surface having:
         a first downstream curve transitioning from perpendicular to the first flow to between 60 degrees relative to the first flow and 15 degrees relative to the first flow;
         a straight portion extending from the first downstream curve; and
         a second downstream curve transitioning from the straight portion to a downstream portion of the exhaust runner, wherein the second downstream curve has a side portion that continues along a line defined by the straight portion, wherein the second flow of an exhaust gas is introduced into the first flow of the exhaust gas while maintaining a velocity of the first flow of the exhaust gas.

7. The exhaust assembly according to claim 6, further comprising:
   a diverging zone beginning at the first downstream curve, wherein the downstream surface diverges from the upstream curved surface to increase a cross sectional area of the passageway.

8. The exhaust assembly according to claim 6, further comprising:
   an engine flange having a plurality of bores for passage of a respective plurality of bolts for securing the exhaust nozzle tip to the internal combustion engine.

9. The exhaust assembly according to claim 6, further comprising:
   a water jacket disposed about the exhaust runner and configured to receive a flow of water therethrough.

10. The exhaust assembly according to claim 9, further comprising:
    an air gap disposed between the exhaust runner and the water jacket to reduce a thermal transfer of heat from the exhaust runner to the flow of water in the water jacket.

11. The exhaust assembly according to claim 6, further comprising:
    a runner flange configured to mate with a runner cutout of the exhaust runner.

12. The exhaust assembly according to claim 11, wherein the runner flange is welded into the runner cutout.

13. A power supply comprising:
- an internal combustion engine;
- an air system to deliver air to the internal combustion engine;
- an exhaust assembly for the internal combustion engine, the exhaust assembly including
- an exhaust runner configured to convey a first flow of exhaust gas to a turbocharger, and
- an exhaust nozzle tip to fluidly connect the internal combustion engine to the exhaust runner, the exhaust nozzle tip having:
  - an inlet configured to receive a second flow of an exhaust gas from an internal combustion engine;
  - an outlet configured to introduce the second flow of the exhaust gas into the first flow of the exhaust gas in the exhaust runner; and
  - a passageway configured to convey the second flow of the exhaust gas from the inlet to the outlet, the passageway being defined by an upstream curved surface and a downstream surface, the upstream curved surface being a continuous curve from perpendicular to the first flow to between 60 degrees relative to the first flow and 15 degrees relative to the first flow, the downstream surface having:
    - a first downstream curve transitioning from perpendicular to the first flow to between 60 degrees relative to the first flow and 15 degrees relative to the first flow;
    - a straight portion extending from the first downstream curve; and
    - a second downstream curve transitioning from the straight portion to a downstream portion of the exhaust runner, wherein the second downstream curve has a side portion that continues along a line defined by the straight portion, wherein the second flow of an exhaust gas is introduced into the first flow of the exhaust gas while maintaining a velocity of the first flow of the exhaust gas.

14. The power supply according to claim 13, further comprising:
- a diverging zone beginning at the first downstream curve, wherein the downstream surface diverges from the upstream curved surface to increase a cross sectional area of the passageway.

15. The power supply according to claim 13, further comprising:
- an engine flange having a plurality of bores for passage of a respective plurality of bolts for securing the exhaust nozzle tip to the internal combustion engine.

16. The power supply according to claim 13, further comprising:
- a plurality of exhaust nozzle tips corresponding to a plurality of cylinders in the internal combustion engine.

17. The power supply according to claim 13, further comprising:
- a water jacket disposed about the exhaust runner and configured to receive a flow of water therethrough.

18. The power supply according to claim 17, further comprising:
- an air gap disposed between the exhaust runner and the water jacket to reduce a thermal transfer of heat from the exhaust runner to the flow of water in the water jacket.

19. The power supply according to claim 13, further comprising:
- a runner flange configured to mate with a runner cutout of the exhaust runner.

20. The power supply according to claim 19, wherein the runner flange is welded into the runner cutout.

\* \* \* \* \*